United States Patent
Hasuo

(10) Patent No.: US 12,104,747 B2
(45) Date of Patent: Oct. 1, 2024

(54) MACHINE COMPRISING LUBRICATION CHAMBER

(71) Applicant: FANUC CORPORATION, Yamanashi (JP)

(72) Inventor: Takeshi Hasuo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/547,232

(22) PCT Filed: Feb. 18, 2022

(86) PCT No.: PCT/JP2022/006764
§ 371 (c)(1),
(2) Date: Aug. 21, 2023

(87) PCT Pub. No.: WO2022/181499
PCT Pub. Date: Sep. 1, 2022

(65) Prior Publication Data
US 2024/0151351 A1  May 9, 2024

(30) Foreign Application Priority Data
Feb. 25, 2021 (JP) .................................. 2021-029090

(51) Int. Cl.
*F16N 31/00* (2006.01)
*F16C 33/66* (2006.01)
*F16N 1/00* (2006.01)

(52) U.S. Cl.
CPC .......... *F16N 31/00* (2013.01); *F16C 33/6685* (2013.01); *F16N 1/00* (2013.01); *F16N 2210/12* (2013.01); *F16N 2210/14* (2013.01)

(58) Field of Classification Search
CPC ......................... F16C 37/007; F16C 33/6659; F16C 33/6685; F16N 2210/14; F16N 2210/12; F16N 1/00
(Continued)

(56) References Cited

U.S. PATENT DOCUMENTS 2,398,944 A * 4/1946 Kopetz ...................... F16N 7/40
184/6
3,042,462 A * 7/1962 Rosskopf ............ F16C 33/6659
384/466
(Continued)

FOREIGN PATENT DOCUMENTS

| JP | S59161291 A | 9/1984 |
| JP | H09023607 A | 1/1997 |

(Continued)

OTHER PUBLICATIONS

PCT International Search Report dated May 17, 2022 for related International Application No. PCT/JP2022/006764, from which the instant application is based, 4 pgs.
(Continued)

*Primary Examiner* — Henry Y Liu
(74) *Attorney, Agent, or Firm* — Fredrikson & Byron, P.A.

(57) ABSTRACT

This machine comprises a shaft which is along a prescribed axis, a bearing which bears the shaft, a lubrication chamber which contains the shaft and the bearing and which can store a fluid lubricant, and three through-holes which each pass through a wall surface of the lubrication chamber and which can be opened, wherein: two through-holes (for example, a through-hole or a through-hole) among the three through-holes open to respective spaces on both sides of the lubrication chamber in the axial direction with the bearing sandwiched therebetween; when the lubricant is introduced, at least one of the two through-holes is open as a lubricant
(Continued)

introduction hole; and when the lubricant is drained, the two through-holes are open as ventilation holes, and the remaining through-hole (for example, a through-hole) is open as a lubricant drainage hole.

11 Claims, 12 Drawing Sheets

(58) Field of Classification Search
USPC ............................................ 184/6.12
See application file for complete search history.

(56) References Cited

U.S. PATENT DOCUMENTS

| | | | | |
|---|---|---|---|---|
| 3,767,013 | A * | 10/1973 | Caldwell | F16C 33/6659 384/603 |
| 4,322,030 | A * | 3/1982 | Jacobson | F16C 37/00 310/90 |
| 4,919,551 | A * | 4/1990 | Nunotani | F16H 57/04 277/408 |
| 5,192,139 | A * | 3/1993 | Hiramoto | F16C 19/525 409/135 |
| 5,667,314 | A * | 9/1997 | Limanowka | F16C 41/02 384/619 |
| 6,228,016 | B1 * | 5/2001 | Kristensen | F16J 15/443 494/83 |
| 6,267,204 | B1 * | 7/2001 | Kristensen | F16C 33/6674 184/6.12 |
| 6,398,509 | B1 * | 6/2002 | Okazaki | F16C 33/6659 409/231 |
| 6,454,051 | B1 * | 9/2002 | Okayasu | F16N 7/36 184/13.1 |
| 7,500,311 | B2 * | 3/2009 | Shimomura | F16C 19/54 184/7.4 |
| 7,594,757 | B2 * | 9/2009 | Verhaegen | H02K 9/19 384/313 |
| 7,600,921 | B2 * | 10/2009 | Moller | F16N 7/12 384/462 |
| 7,753,646 | B1 * | 7/2010 | Keck | F01D 15/10 415/112 |
| 8,302,737 | B2 * | 11/2012 | Yanohara | F16C 33/6674 184/7.4 |
| 8,444,542 | B2 * | 5/2013 | Ostkamp | B04B 9/04 494/83 |
| 8,652,021 | B2 * | 2/2014 | Yumoto | F16N 7/36 184/6 |
| 9,541,137 | B2 * | 1/2017 | Mori | F16C 19/546 |
| 10,208,623 | B2 * | 2/2019 | Hettinger | F01D 25/16 |
| 10,639,648 | B2 * | 5/2020 | Ostkamp | F16C 33/6659 |
| 2002/0048517 | A1 * | 4/2002 | Sugita | F16C 33/6674 417/12 |
| 2003/0031554 | A1 * | 2/2003 | Rockwood | F16C 33/6659 415/111 |
| 2007/0177835 | A1 * | 8/2007 | Verhaegen | H02K 5/1732 384/462 |
| 2009/0129714 | A1 * | 5/2009 | Shimomura | G01P 3/443 384/475 |
| 2009/0148088 | A1 * | 6/2009 | Sasabe | F16C 35/12 384/467 |
| 2013/0190160 | A1 * | 7/2013 | Yumoto | B04B 1/20 494/15 |
| 2014/0029882 | A1 * | 1/2014 | Palmer | F16C 33/6685 384/473 |
| 2015/0226266 | A1 * | 8/2015 | Mori | B23Q 11/123 384/467 |
| 2016/0298491 | A1 * | 10/2016 | Hettinger | F02C 6/12 |
| 2016/0310969 | A1 * | 10/2016 | Ostkamp | F16C 33/667 |
| 2016/0377123 | A1 * | 12/2016 | Yoshino | F16C 33/6662 384/476 |
| 2018/0223907 | A1 * | 8/2018 | Ito | F16C 33/667 |

FOREIGN PATENT DOCUMENTS

| | | |
|---|---|---|
| JP | 2006038019 A | 2/2006 |
| JP | 2007010133 A | 1/2007 |
| JP | 2016540640 A | 12/2016 |

OTHER PUBLICATIONS

English translation for Japanese Publication No. JP 1984(S59)-161291 A, published Sep. 12, 1984, 5 pgs.
English translation for Japanese Publication No. JP 2006-038019 A, published Feb. 9, 2006, 16 pgs.
English translation for Japanese Publication No. JP 2016-540640 A, published Dec. 28, 2016, 26 pgs.
English translation or Japanese Publication No. JP 2007-010133 A, published Jan. 18, 2007, 31 pgs.
English translation for Japanese Publication No. JP 1997(H09)-023607 A, published Jan. 21, 1997, 27 pgs.

* cited by examiner

MACHINE COMPRISING LUBRICATION CHAMBER

RELATED APPLICATIONS

This application is a 35 U.S.C. 371 national phase filing from International Application No. PCT/JP2022/006764, filed Feb. 18, 2022, which claims priority to Japanese Application No. 2021-029090, filed, Feb. 25, 2021, the contents of which are incorporated herein by reference.

FIELD

The present invention relates to a machine, more particularly relates to a machine with a lubrication chamber.

BACKGROUND

A robot joint or other machine moving part often uses a speed reducer comprised of a shaft, bearing, gears, and other machine elements. As the method of lubrication of the machine elements at the inside of the speed reducer, use of an oil bath system arranging the machine elements inside a sealed lubrication chamber and sealing a lubricant in the lubrication chamber to form an oil bath has been the general practice. In the oil bath system, metal particles, sludge, and other debris are generated due to the wear of the machine elements and heat generated by the lubricant, so it has been necessary to periodically clean or replace the lubricant inside the lubrication chamber. For this reason, a fill inlet of the lubricant has been provided at the top part of the lubrication chamber and a drain outlet has been provided at the bottom part. As the structure of the lubrication chamber, one sandwiching the two sides of the speed reducer in the axial direction by predetermined members has been the general practice, so often relatively large spaces are formed at the two sides of the speed reducer.

In recent years, in a speed reducer, the bearings and other machine elements have often been densely arranged for the purpose of improving the load capacity and reducing the size. The clearances inside of the speed reducer have become narrower. Further, as the lubricant, often a high viscosity one has been employed for improving the ability to form an oil film. There is a strong tendency for it to pool inside the speed reducer. As a result, the route for passage of air through the inside of the speed reducer becomes narrower. Time has been taken for drainage of lubricant at the side with no drain outlet in the lubricant sealed in at the spaces at the two sides of the speed reducer in the axial direction. This has led to a drop in the efficiency of maintenance.

FIG. 8A is a vertical cross-sectional view of a conventional machine 50. The machine 50 is provided with a speed reducer 8, a lubrication chamber 20 containing the speed reducer 8 and able to store fluid lubricant 21, and a fill inlet 51 and drain outlet 52 passing through the walls of the lubrication chamber 20. The fill inlet 51 and the drain outlet 52 open to the space S1 at one side among the spaces S1 and S2 at the two sides of the lubrication chamber 20 straddling the speed reducer 8 in the direction of the axis O of the speed reducer 8. Further, the fill inlet 51 opens at the wall of the lubrication chamber 20 at a position higher than the top level of the lubricant 21 while the drain outlet 52 opens at the wall of the lubrication chamber 20 at a position lower than the top level of the lubricant 21. The fill inlet 51 and the drain outlet 52 have openable plugs 53, 54 provided at them.

FIG. 8B is a vertical cross-sectional view of a conventional machine 50 showing the drainage of the lubricant 21. At the time of draining the lubricant 21, the fill inlet 51 is opened and utilized as a vent while the drain outlet 52 is opened and the lubricant 21 is drained. If draining the lubricant 21 from the drain outlet 52, the air flowing in from the fill inlet 51 pushes out the lubricant 21. However, the volume of the air inside of the speed reducer 8 is small and the high viscosity lubricant 21 is pooled inside of the speed reducer 8, so the inflowing air has a difficult time passing through the inside of the speed reducer 8. For this reason, time ends up being required for draining the lubricant 21 in the space at the side of the lubrication chamber 20 with no fill inlet 51 or drain outlet 52. As art relating to such a machine with a lubrication chamber, for example the later explained literature is known.

PTL 1 discloses a joint device of a robot etc. which is provided with a magnet held in an oil bath and a drain plug enabling detachment of the magnet for removing particles generated due to wear of the gears of the speed reducer.

PTL 2 discloses a speed reducer with an air vent designed so that lubricant filled inside a casing of the speed reducer does not leak to the outside from the air vent, provided with a casing forming an inside volume part in which the lubricant is sealed and a separate spatial volume part provided so as to pass through the inside volume part, the separate spatial volume part arranged to be positioned upward in the vertical direction from a top level of the lubricant inside of the inside volume part, and the air vent provided at part of the separate spatial volume part.

CITATIONS LIST

Patent Literature

[PTL 1] JP 1984(S59)-161291 A
[PTL 2] JP 2006-038019 A

SUMMARY

Technical Problem

The present invention, in consideration of the conventional problem, has as its object the provision of a technique for shortening a maintenance time of a lubricant.

Solution to Problem

One aspect of the disclosure provides a machine comprising: a shaft extending along a predetermined axis; a bearing receiving the shaft; a lubrication chamber configured to contain the shaft and the bearing and to store fluid lubricant; and three pluggable through holes which pass through a wall of the lubrication chamber, wherein two through holes among the three through holes open at spaces at both sides of the lubrication chamber straddling the bearing, and when filling the lubricant, at least one through hole among the two through holes is unplugged as a fill inlet of the lubricant, and when draining the lubricant, the two through holes is unplugged as vents and the remaining one through hole is unplugged as a drain outlet of the lubricant.

Advantageous Effects of Invention

According to one aspect of the present disclosure, at the time of draining the lubricant, the two through holes opening at the spaces at the both sides of the lubrication chamber straddling the bearing in the axial direction are unplugged as vents and the remaining one through hole is unplugged as a drain outlet, whereby the air flowing in from the through holes utilized as vents pushes out the lubricant at the spaces at the both sides of the lubrication chamber and also pushes out the lubricant pooled inside the bearing, so it is possible to drain the lubricant more quickly compared with the past and possible to shorten the maintenance time of the lubricant.

DESCRIPTION OF EMBODIMENTS

Figure 1:
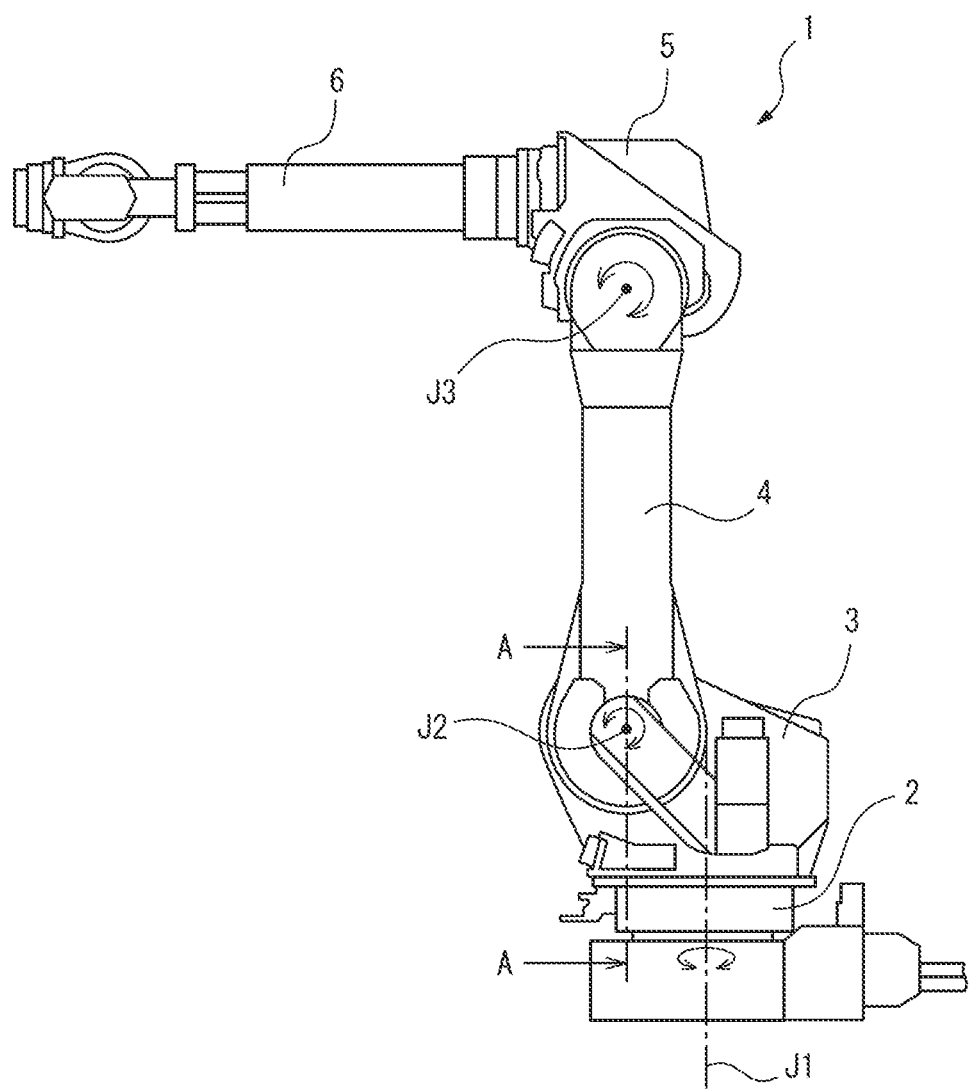
FIG. 1 is an overview of a machine of a first embodiment.

Below, referring to the attached drawings, embodiments of the present disclosure will be explained in detail. In the drawings, the same or similar component elements will be assigned the same or similar notations. Further, the embodiments described below do not limit the technical scope of the invention described in the claims and the meaning of the terms.

FIG. 1 is an overview of a machine 1 of a first embodiment. The machine 1 is for example a vertical articulated robot. The machine 1 is provided with a base 2 set on an installation surface, a turret 3 (first member) supported with respect to the base 2 to be able to rotate about a first axis J1 extending in a direction perpendicular to the installation surface, and a first arm 4 (second member) supported with respect to the turret 3 to be able to rotate about a second axis J2 extending in a direction perpendicular to the first axis J1. Further, the machine 1 is provided with a second arm 5 supported with respect to the first arm 4 to be able to rotate about a third axis J3 parallel to the second axis J2 and a three-axis wrist unit 6 at a front end of the second arm 5.

Figure 2A:
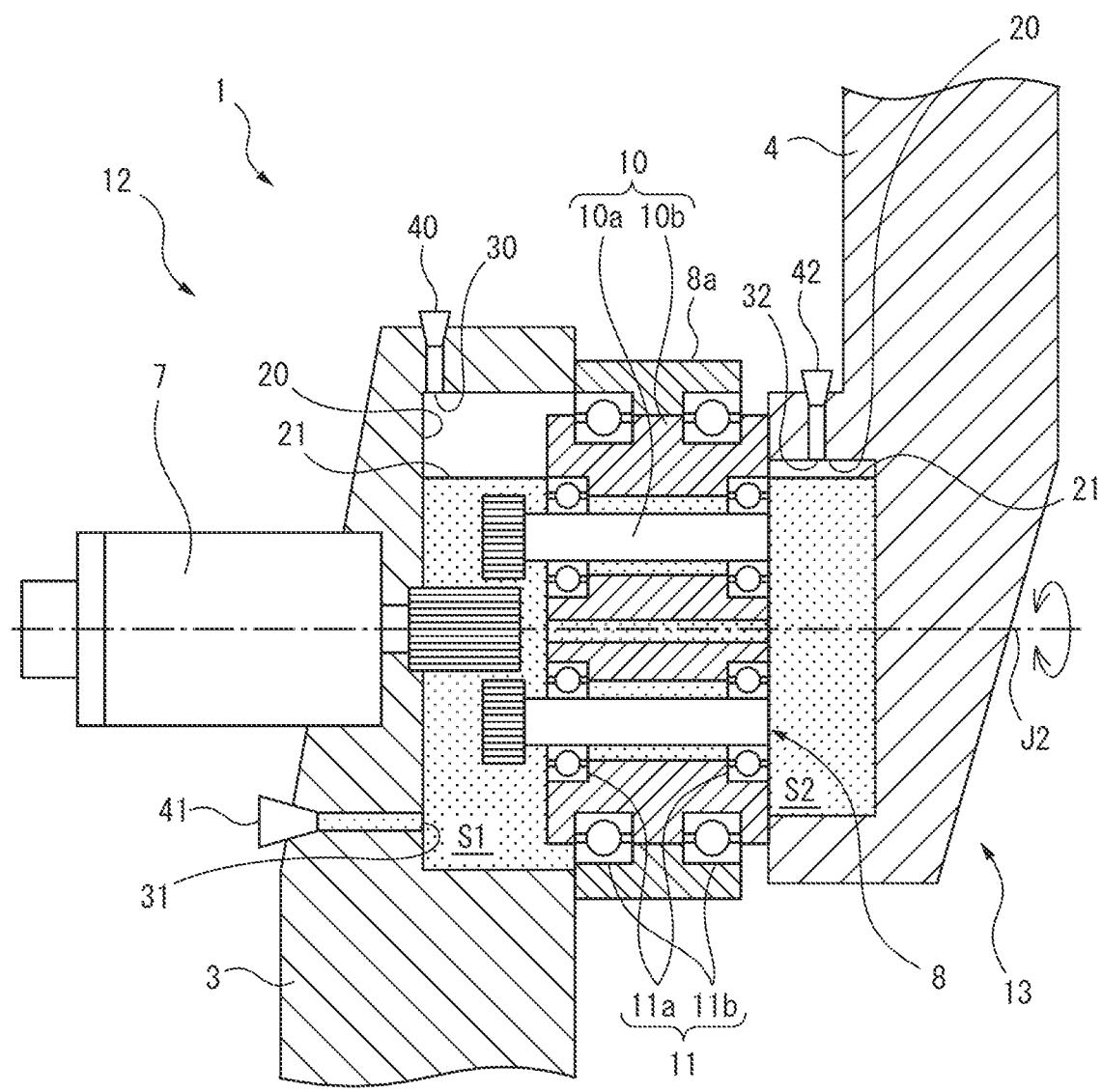
FIG. 2A is a cross-sectional view along a line A-A of a machine of the first embodiment.

FIG. 2A is a cross-sectional view along a line A-A of a machine 1 of the first embodiment (for cutting line A-A, see FIG. 1). FIG. 2A shows a moving part able to rotate about for example the second axis J2. The machine 1 is, for example, provided with a drive source 7 fixed to the turret 3 (first member), a shaft 10 able to operate in accordance with the drive source 7 and running along the second axis J2, and a bearing 11 receiving the shaft 10. The drive source 7 is for example a servo motor while the shaft 10 and bearing 11 are for example machine elements of the speed reducer 8. The shaft 10 for example is provided with an input shaft 10a and an output shaft 10b. The bearing 11 is, for example, provided with an input bearing 11a receiving the input shaft 10a and an output bearing 11b receiving the output shaft 10b. The case 8a of the speed reducer 8 is fixed to the turret 3 while the output shaft 10b of the speed reducer 8 is fixed to the first arm 4. The input shaft 10a inputs power from the drive source 7 and transmits the power to the output shaft 10b. The output shaft 10b transmits the power to the first arm 4 (second member). Due to this, the first arm 4 (second member) rotates with respect to the turret 3 (first member) about the second axis J2.

Further, the machine 1 is provided with a lubrication chamber 20 housing the shaft 10 and bearing 11 and able to store fluid lubricant 21 and three pluggable through holes 30 to 32 passing through the walls of the lubrication chamber 20. The lubrication chamber 20 is configured surrounded by the turret 3 (first member) and first arm 4 (second member) straddling the bearing 11 (or speed reducer 8) in the direction of the second axis J2. The three through holes 30 to 32 are, for example, arranged at the turret 3 and the first arm 4. Two through holes (for example through holes 30, 32) among the three through holes 30 to 32 respectively open to the spaces S1, S2 at the both (two) sides of the lubrication chamber 20 straddling the bearing 11 (or speed reducer 8) in the direction of the second axis J2. The two through holes (for example through holes 30, 32) respectively opening to the spaces S1, S2 at the both sides of the lubrication chamber 20 straddling the bearing 11 (or speed reducer 8) are respectively arranged at the turret 3 (first member) and the first arm 4 (second member).

The lubricant 21 is, for example, a lubrication oil. The lubricant 21 mitigates the friction or wear of the gears or bearing and other machine elements, but metal particles or sludge or other debris are generated due to wear of the machine elements, heat generated by the lubricant 21, etc., so the lubricant 21 inside the lubrication chamber 20 has to be periodically cleaned or replaced. Therefore, at the time of filling the lubricant 21, at least one through hole among the two through holes (for example through holes 30, 32) respectively opening at the spaces S1, S2 at the two sides of the lubrication chamber 20 straddling the bearing 11 (or speed reducer 8) in the direction of the second axis J2 among the three through holes 30 to 32 is unplugged as the fill inlet of the lubricant 21. At the time of draining the lubricant 21, the two through holes (for example through holes 30, 32) respectively opening at the spaces S1, S2 at the two sides of the lubrication chamber 20 straddling the bearing 11 (or speed reducer 8) in the direction of the second axis J2 among the three through holes 30 to 32 are unplugged as vents while the remaining one through hole (for example through hole 31) is unplugged as a drain outlet of the lubricant 21.

At the three through holes 30 to 32, openable plugs 40 to 42 are arranged. The plugs 40 to 42 are for example rubber plugs. At the time of maintenance of the lubricant 21, to facilitate access to the three through holes 30 to 32 and the three plugs 40 to 42, the three through holes 30 to 32 may all be arranged at the side surface 12 at one side of the machine 1 in the direction of the second axis J2. They are not arranged at the side surface 13 at the opposite side of the machine 1 in the direction of the second axis J2. Further, two through holes 30, 31 among the three through holes 30 to 32 are for example arranged at a predetermined angular interval (for example 180° interval etc.) about the second axis J2 of the turret 3 (first member) while the remaining one through hole 32 is for example arranged at the first arm 4 (second member).

For example, if installing the machine 1 on the ground (that is, if the posture of the lubrication chamber 20 is the state of FIG. 1), two through holes 30, 32 are arranged at positions equal to the top level of the lubricant 21 inside the lubrication chamber 20 or at positions higher than the top level while the remaining one through hole 31 is arranged at a position lower than the top level of the lubricant 21 inside the lubrication chamber 20. Due to this, at the time of filling the lubricant 21, at least one through hole among the two through holes 30, 32 is unplugged as the fill inlet of the lubricant 21. Further, at the time of draining the lubricant 21, two through holes 30, 32 are unplugged as vents and the remaining one through hole 31 is unplugged as a drain outlet of the lubricant 21.

Further, for example if installing the machine 1 at the ceiling (that is, if the posture of the lubrication chamber 20 is changed from the state of FIG. 1 to a posture turned upside down by 180°), by making the first arm 4 (second member) rotate 180°, the two through holes 31, 32 are arranged at positions equal to the top level of the lubricant 21 inside the lubrication chamber 20 or a position higher than the top level while the remaining one through hole 30 is arranged at a position lower than the top level of the lubricant 21 inside the lubrication chamber 20. Due to this, at the time of filling the lubricant 21, at least one through hole among the two through holes 31, 32 is unplugged as the fill inlet of the lubricant 21. At the time of draining the lubricant 21, the two through holes 31, 32 are unplugged as vents and while the remaining one through hole 30 is unplugged as a drain outlet of the lubricant 21.

Further, for example if installing the machine 1 on a side wall (that is, if the posture of the lubrication chamber 20 is changed to a posture laid down 90° from the state of FIG. 1), when the through hole 30 is arranged at the far side of the plane of FIG. 2A and the through hole 31 is arranged at the near side of the plane of FIG. 2A, by making the front end of the first arm 4 (second member) rotate 90° to the near side of the plane of FIG. 2A, the two through holes 31, 32 are arranged at positions equal to the top level of the lubricant 21 inside the lubrication chamber 20 or positions higher than the top level while the remaining one through hole 30 is arranged at a position lower than the top level of the lubricant 21 inside the lubrication chamber 20. Due to this, at the time of filling the lubricant 21, at least one through hole among the two through holes 31, 32 is unplugged as the fill inlet of the lubricant 21. At the time of draining the lubricant 21, the two through holes 31, 32 are unplugged as vents and the remaining one through hole 30 is unplugged as a drain outlet of the lubricant 21.

In this way, at two or more postures of the lubrication chamber 20, two through holes among the three through holes 30 to 32 can be arranged at positions equal to the top level of the lubricant 21 in the lubrication chamber 20 or at positions higher than the top level and the remaining one through hole can be arranged at a position lower than the top level of the lubricant 21 in the lubrication chamber 20.

Figure 2B:
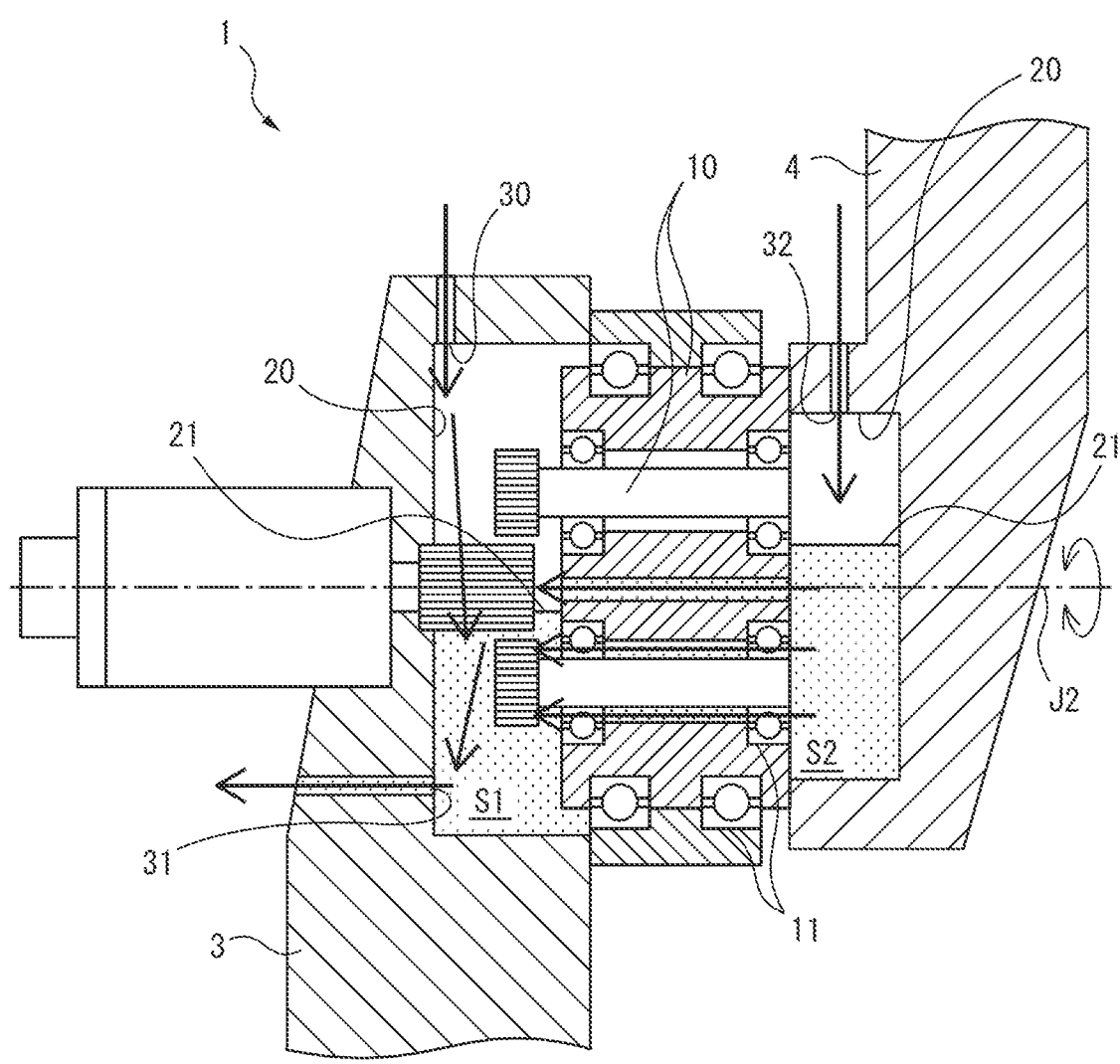
FIG. 2B is a cross-sectional view along a line A-A of a machine of the first embodiment showing drainage of a lubricant.

FIG. 2B is a cross-sectional view along a line A-A of a machine 1 of the first embodiment showing drainage of a lubricant 21. For example, if installing the machine 1 on the ground (that is, if the posture of the lubrication chamber 20 is the state of FIG. 1), the two through holes 30, 32 arranged at positions equal to the top level of the lubricant 21 inside the lubrication chamber 20 or positions higher than the top level at the time of draining the lubricant 21 and respectively opening at the spaces S1, S2 at the two sides of the lubrication chamber 20 straddling the bearing 11 (or speed reducer 8) in the direction of the second axis J2 are unplugged as vents and the through hole 31 arranged at a position lower than the top level of the lubricant 21 inside the lubrication chamber 20 is unplugged as a drain outlet. Due to this, the air flowing in from the two through holes 30, 32 utilized as vents pushes out the lubricant 21 at the spaces S1, S2 at the two sides of the lubrication chamber 20 and also pushes out the lubricant 21 pooled inside the bearing 11 (or the speed reducer 8), so it is possible to drain the lubricant 21 more quickly compared with the past and possible to shorten the maintenance time of the lubricant 21.

The above configuration of the machine 1 is one example. It should be noted that various changes can be made. For example, the machine 1 need not be a vertical articulated robot and may be a horizontal articulated robot, parallel link robot, humanoid, machine tool, or other type of machine. Further, the first member and second member need not be a turret 3 and first arm 4 and may be other members of machine moving parts such as a first arm 4 and a second arm 5.

Further, the first member and the second member may be not a first link and second link of a robot, but other members of a machine such as a first housing and second housing of a vehicle etc. Further, the machine 1 need not be provided with the speed reducer 8. Further, the lubricant 21 may be not a lubrication oil, but a fluid grease. Further, the lubrication chamber 20 may be configured to be surrounded not by the first member and second member, but by a single housing. Further, the plugs 40 to 42 need not be rubber plugs and may be solenoid valves or screw-in type metal plugs.

Figure 3A:
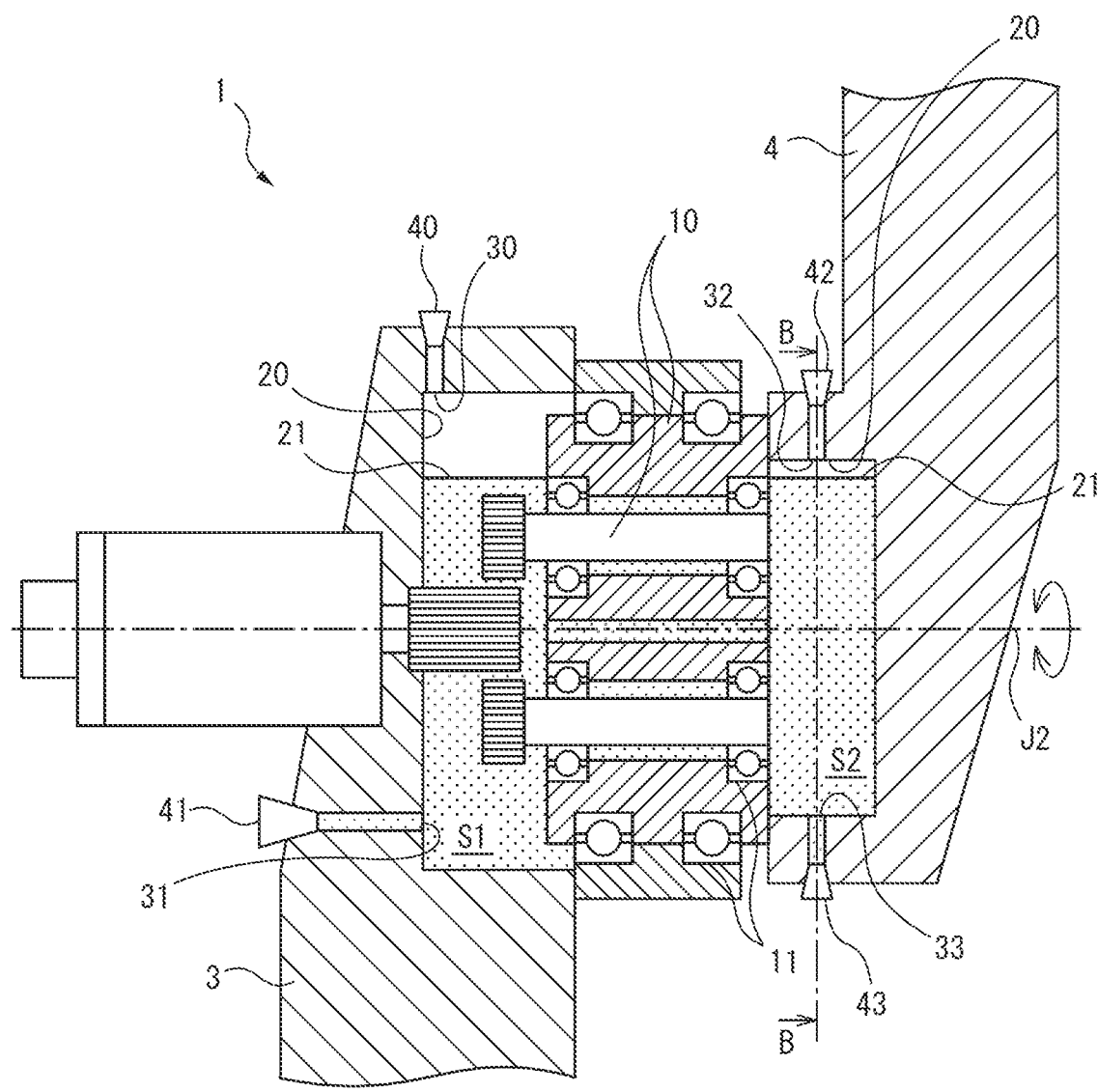
FIG. 3A is a cross-sectional view along a line A-A of a machine of a second embodiment.

FIG. 3A is a cross-sectional view along a line A-A of a machine 1 of a second embodiment (for cutting line A-A, see FIG. 1). Here, only the parts different from the machine 1 of the first embodiment will be explained. The machine 1 of the second embodiment differs from that of the first embodiment on the point of four pluggable through holes 30 to 33 passing through the walls of the lubrication chamber 20 and four plugs 40 to 43 being provided. The two through holes 30, 31 among the four through holes 30 to 33 are arranged at a predetermined angular interval (for example 180° interval) about the second axis J2 of the turret 3 (first member) and the remaining two through holes 32, 33 are arranged at a predetermined angular interval (for example 180° interval) about the second axis J2 of the first arm 4 (second member). Among the four through holes 30 to 33, two through holes (for example through holes 30, 32, through holes 31, 33, through holes 31, 32, or through holes 30, 33) respectively opening at the spaces S1, S2 at the two sides of the lubrication chamber 20 straddling the bearing 11 (or speed reducer 8) in the direction of the second axis J2 can be utilized as vents and the remaining two through holes (for example through holes 31, 33, through holes 30, 32, through holes 30, 33, or through holes 31, 32) can be utilized as drain outlets.

For example, if installing the machine 1 on the ground (that is, if the posture of the lubrication chamber 20 is the state of FIG. 1), two through holes 30, 32 are arranged at positions equal to the top level of the lubricant 21 inside the lubrication chamber 20 or at positions higher than the top level while the remaining two through holes 31, 33 are arranged at positions lower than the top level of the lubricant 21 inside the lubrication chamber 20. Due to this, at the time of filling the lubricant 21, at least one through hole among the two through holes 30, 32 is unplugged as the fill inlet of the lubricant 21. Further, at the time of draining the lubricant 21, two through holes 30, 32 are unplugged as vents and the remaining two through holes 31, 33 are unplugged as drain outlets of the lubricant 21.

Further, for example if installing the machine 1 at the ceiling (that is, if the posture of the lubrication chamber 20 is changed from the state of FIG. 1 to a posture turned upside down by 180°), the two through holes 31, 33 are arranged at positions equal to the top level of the lubricant 21 inside the lubrication chamber 20 or positions higher than the top level while the remaining two through holes 30, 32 are arranged at position lower than the top level of the lubricant 21 inside the lubrication chamber 20. Due to this, at the time of filling the lubricant 21, at least one through hole among the two through holes 31, 33 is unplugged as the fill inlet of the lubricant 21. At the time of draining the lubricant 21, the two through holes 31, 33 are unplugged as vents while the remaining two through holes 30, 32 are unplugged as drain outlets of the lubricant 21.

Further, for example if installing the machine 1 on a side wall (that is, if the posture of the lubrication chamber 20 is changed to a posture laid down 90° from the state of FIG. 1), when the through hole 30 is arranged at the far side of the plane of FIG. 3A and the through hole 31 is arranged at the near side of the plane of FIG. 3A, by making the front end of the first arm 4 (second member) rotate 90° to the near side of the plane or the far side of the plane of FIG. 3A, the two through holes 31, 32 or through holes 31, 33 are arranged at positions equal to the top level of the lubricant 21 inside the lubrication chamber 20 or positions higher than the top level while the remaining two through holes 30, 33 or through holes 30, 32 are arranged at positions lower than the top level of the lubricant 21 inside the lubrication chamber 20. Due to this, at the time of filling the lubricant 21, at least one through hole among the two through holes 31, 32 or through holes 31, 33 is unplugged as the fill inlet of the lubricant 21. At the time of draining the lubricant 21, the two through holes 31, 32 or through holes 31, 33 are unplugged as vents and the remaining two through holes 30, 33 or through holes 30, 32 are unplugged as drain outlets of the lubricant 21.

In this way, at two or more postures of the lubrication chamber 20, two through holes among the four through holes 30 to 33 can be arranged at positions equal to the top level of the lubricant 21 in the lubrication chamber 20 or at positions higher than the top level and the remaining two through holes can be arranged at positions lower than the top level of the lubricant 21 in the lubrication chamber 20.

Figure 3B:
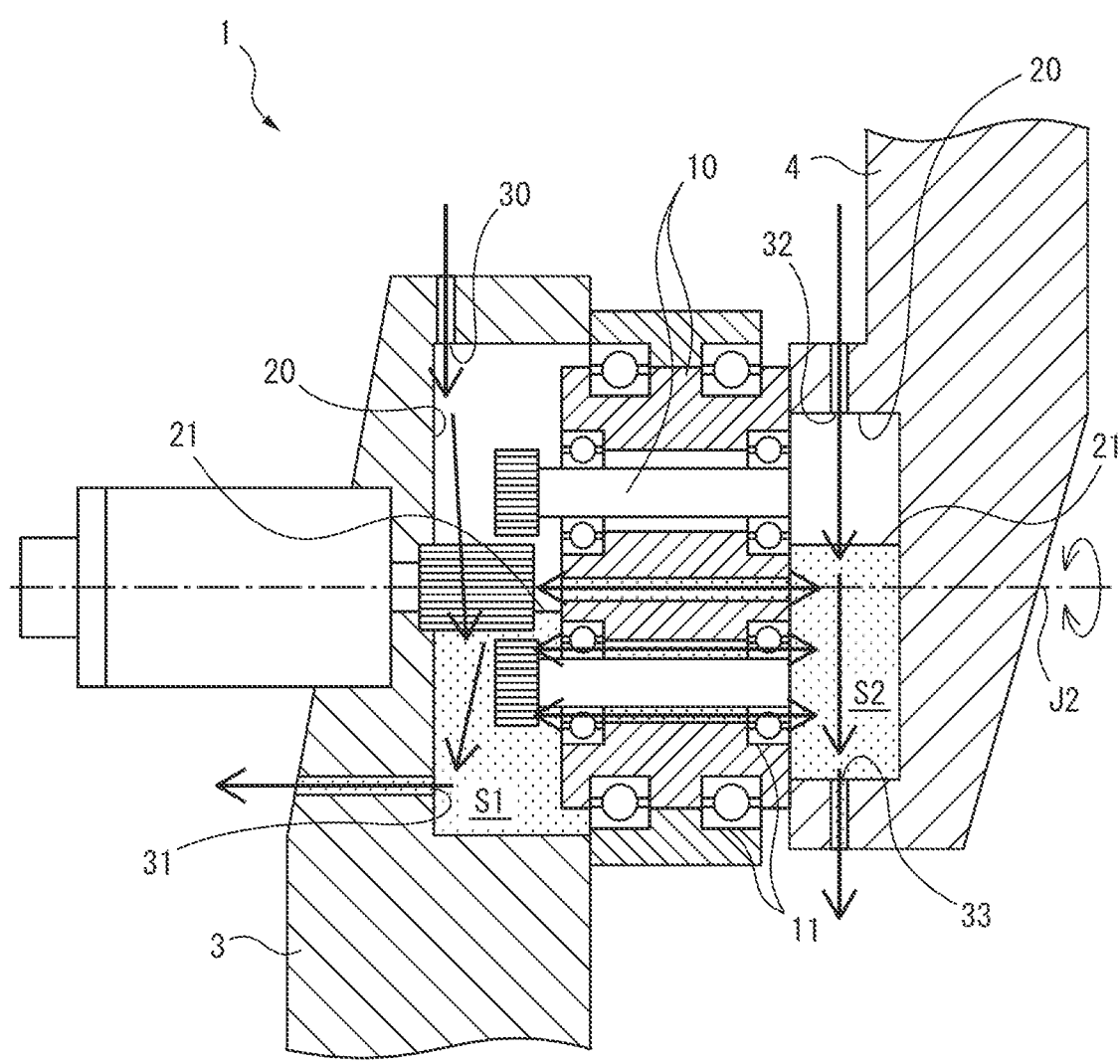
FIG. 3B is a cross-sectional view along a line A-A of a machine of the second embodiment showing drainage of a lubricant.

FIG. 3B is a cross-sectional view along a line A-A of the machine 1 of the second embodiment showing drainage of the lubricant 21. For example, if installing the machine 1 on the ground (that is, if the posture of the lubrication chamber 20 is the state of FIG. 1), the two through holes 30, 32 arranged at positions equal to the top level of the lubricant 21 inside the lubrication chamber 20 or positions higher than the top level at the time of draining the lubricant 21 and respectively opening at the spaces S1, S2 at the two sides of the lubrication chamber 20 straddling the bearing 11 (or speed reducer 8) in the direction of the second axis J2 are unplugged as vents and the two through holes 31, 33 arranged at positions lower than the top level of the lubricant 21 inside the lubrication chamber 20 are unplugged as drain outlets. Due to this, the air flowing in from the two through holes 30, 32 utilized as vents pushes out the lubricant 21 at the spaces S1, S2 at the two sides of the lubrication chamber 20 and also pushes out the lubricant 21 pooled inside the bearing 11 (or the speed reducer 8), so it is possible to drain the lubricant 21 more quickly compared with the past and possible to shorten the maintenance time of the lubricant 21.

Figure 4A:
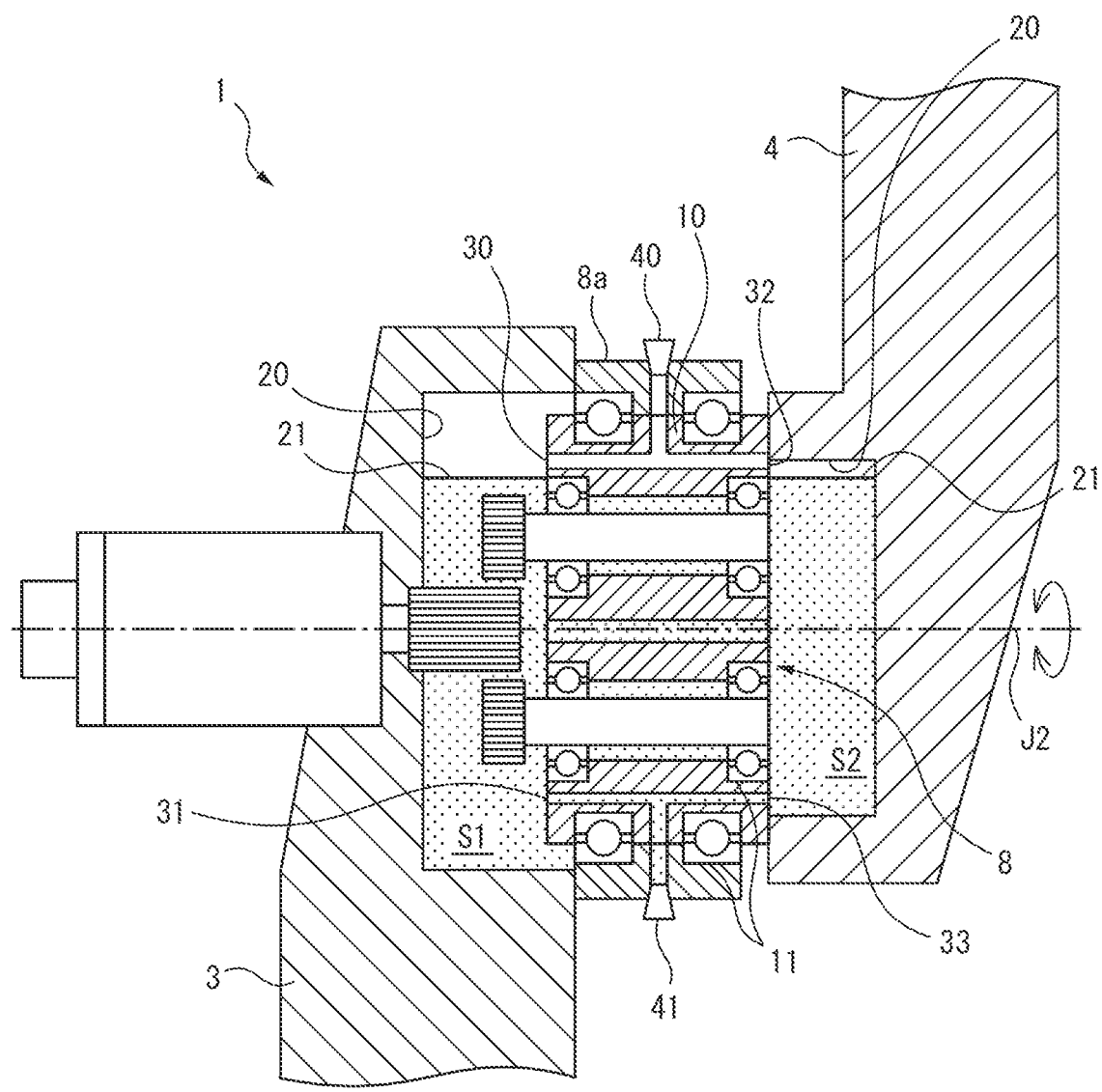
FIG. 4A is a cross-sectional view along a line A-A of a machine of a third embodiment.

FIG. 4A is a cross-sectional view along a line A-A of the machine 1 of a third embodiment (for cutting line A-A, see FIG. 1). Here, only the parts different from the machine 1 of the first embodiment will be explained. The point that the machine 1 of the third embodiment is provided with four pluggable through holes 30 to 33 passing through walls of the lubrication chamber 20 and two plugs 40 to 41 and that the four through holes 30 to 33 are arranged at the shaft 10 (output shaft 10b shown in FIG. 2A) differs from the first embodiment. Among the four through holes 30 to 33, the two through holes (for example through holes 30, 32 or through holes 31, 33) respectively opening at the spaces S1, S2 at the two sides of the lubrication chamber 20 straddling the bearing 11 (or speed reducer 8) in the direction of the second axis J2 merge inside the shaft 10 and open to the external space through the case 8a of the speed reducer 8. Due to this, the number of openings to the external space is reduced and in turn the number of plugs 40 to 41 can be reduced (in this example to two).

Figure 4B:
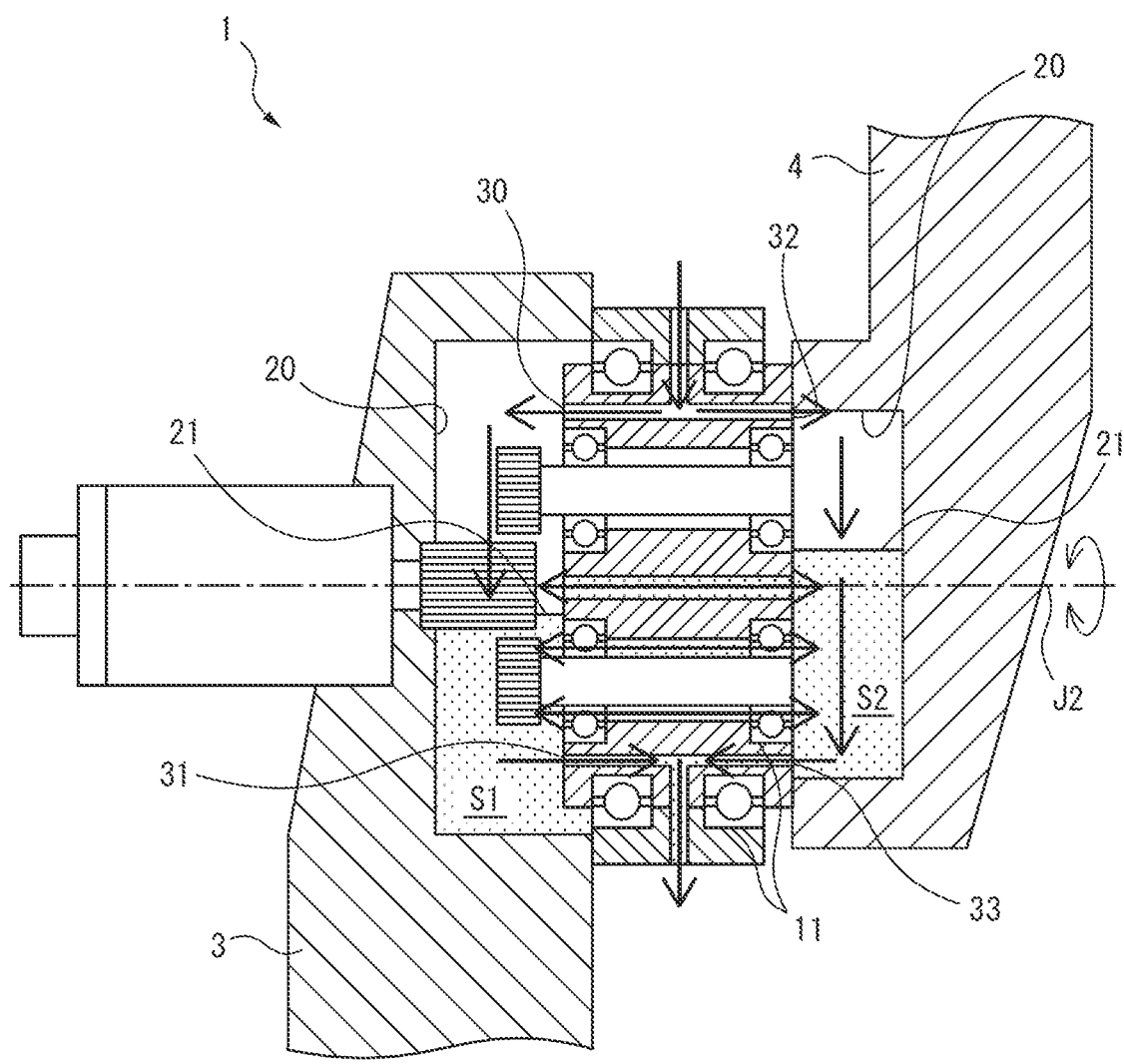
FIG. 4B is a cross-sectional view along a line A-A of a machine of the third embodiment showing drainage of a lubricant.

FIG. 4B is a cross-sectional view along a line A-A of the machine 1 of the third embodiment showing drainage of the lubricant 21. For example, if installing the machine 1 on the ground (that is, if the posture of the lubrication chamber 20 is the state of FIG. 1), the two through holes 30, 32 arranged at positions equal to the top level of the lubricant 21 inside the lubrication chamber 20 or positions higher than the top level at the time of draining the lubricant 21 and respectively opening at the spaces S1, S2 at the two sides of the lubrication chamber 20 straddling the bearing 11 (or speed reducer 8) in the direction of the second axis J2 are unplugged as vents (that is, one plug 40 is opened) and the two through holes 31, 33 arranged at positions lower than the top level of the lubricant 21 inside the lubrication chamber 20 are unplugged as drain outlets (that is, one plug 41 is opened). Due to this, the air flowing in from the two through holes 30, 32 utilized as vents pushes out the lubricant 21 at the spaces S1, S2 at the two sides of the lubrication chamber 20 and also pushes out the lubricant 21 pooled inside the bearing 11 (or the speed reducer 8), so it is possible to drain the lubricant 21 more quickly compared with the past and possible to shorten the maintenance time of the lubricant 21. Note that, at the time of filling the lubricant 21, the two through holes 30, 32 arranged at positions equal to the top level of the lubricant 21 inside the lubrication chamber 20 or at positions higher than the top level and respectively opening at the spaces S1, S2 at the two sides of the lubrication chamber 20 straddling the bearing 11 (or speed reducer 8) in the direction of the second axis J2 are unplugged as fill inlets (that is, one plug 40 is opened).

Figure 5:
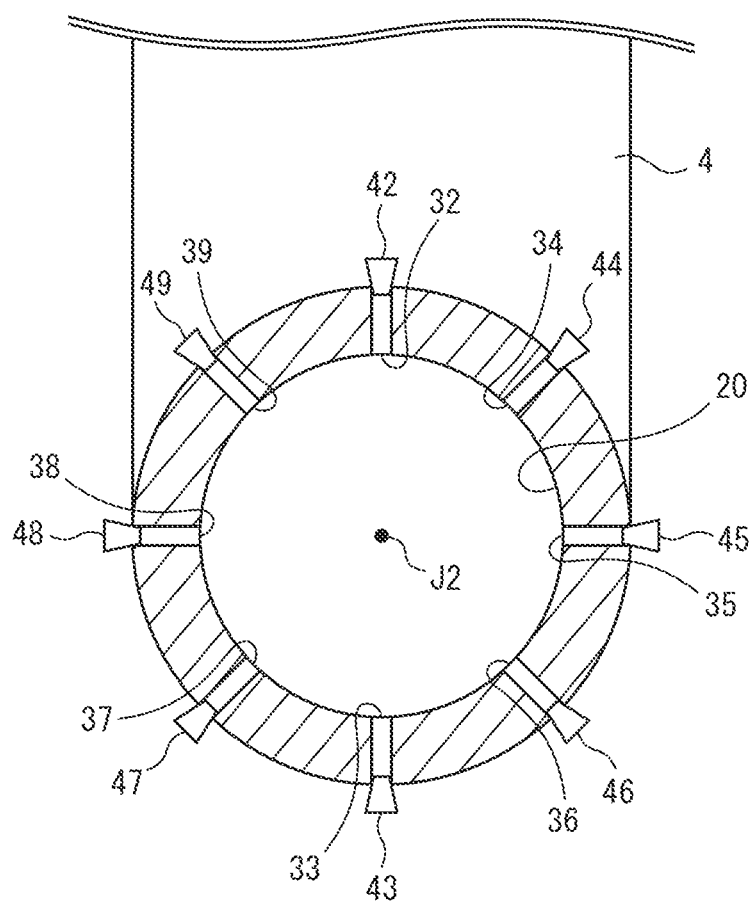
FIG. 5 is a cross-sectional view along a line B-B of a machine of a fourth embodiment.

FIG. 5 is a cross-sectional view along a line B-B of a machine 1 of the fourth embodiment (for cutting line B-B, see FIG. 3A). Here, only the parts different from the machine 1 of the second embodiment will be explained. The point that the machine 1 of the fourth embodiment is provided with 10 pluggable through holes 30 to 39 passing through the walls of the lubrication chamber 20 and 10 plugs 40 to 49 and that eight through holes 32 to 39 among the 10 through holes 30 to 39 are arranged at predetermined angular intervals (for example, 45° intervals) about the second axis J2 of the first arm 4 (second member) differs from the second embodiment. Due to this, regardless of the current rotational positions of the first arm 4, the topmost through hole among the eight through holes 32 to 39 can be utilized as a vent. Note that, the eight through holes may also be arranged at predetermined angular intervals (for example, 45° intervals) about the second axis J2 of not the first arm 4 (second member), but the turret 3 (first member). Further, in the case of the machine 1 of the above third embodiment, the through holes may also be arranged at predetermined angular intervals (for example 15° intervals, 30° intervals, 45° intervals, etc.) about the second axis J2 of the shaft 10. The number of through holes arranged at predetermined angular intervals about the second axis J2 is one example and is not limited.

Further, for example, in the case of a moving part able to rotate about a third axis J3, the lubrication chamber 20 is configured surrounded by the first arm 4 (first member) and second arm 5 (second member), but there is a possibility of the posture of the lubrication chamber 20 being changed to any angle. Therefore, if eight through holes 32 to 39 among the 10 through holes 30 to 39 are arranged at predetermined angular intervals (for example, 45° intervals) about the third axis J3 of the first arm 4 (first member) or second arm 5 (second member), regardless of the current rotational positions of the first arm 4 or the second arm 5, the topmost through hole among the eight through holes 32 to 39 can be utilized as a vent.

Figure 6:
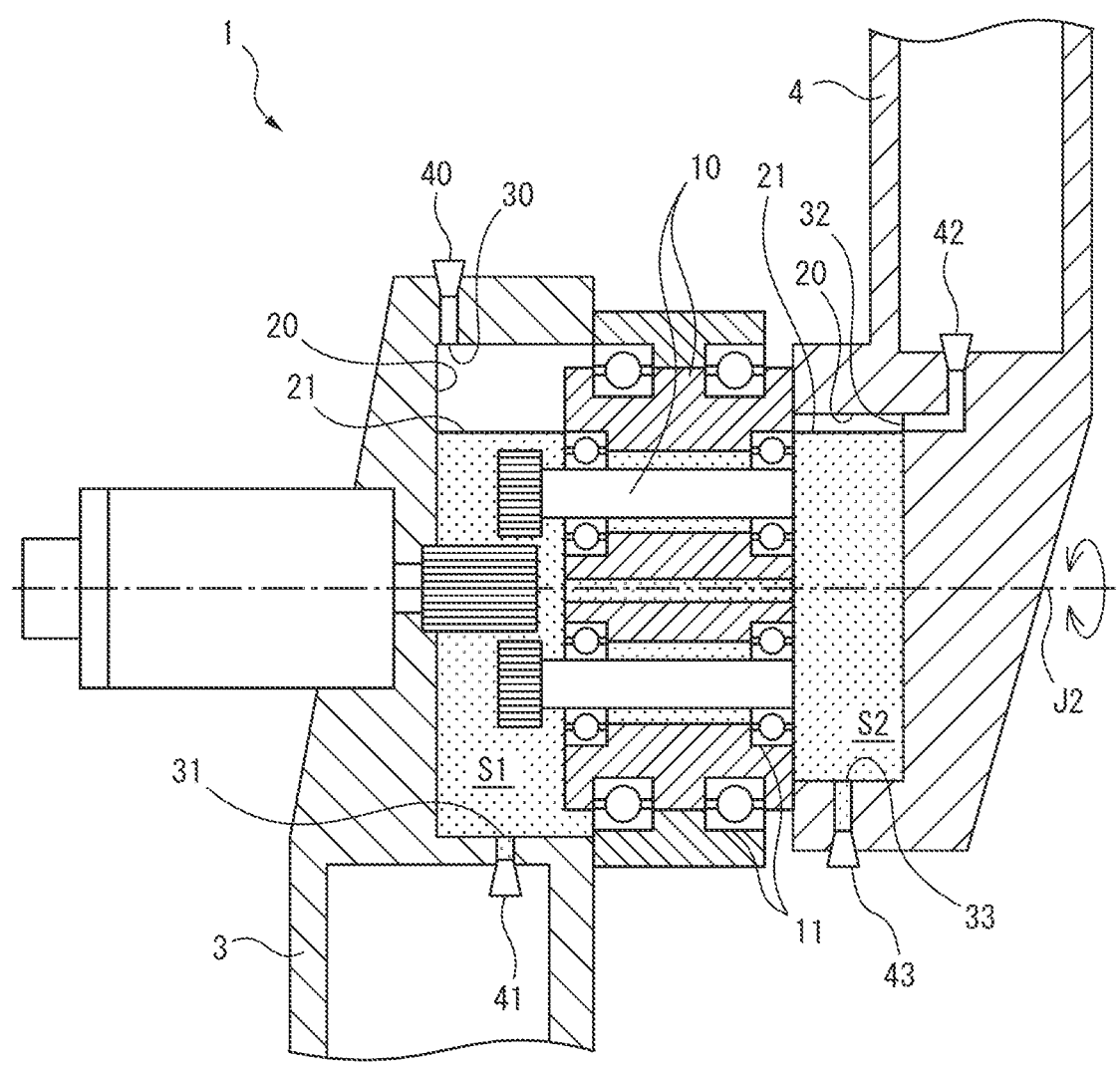
FIG. 6 is a cross-sectional view along a line A-A of a machine of a fifth embodiment.

FIG. 6 is a cross-sectional view along a line A-A of a machine 1 of a fifth embodiment (for cutting line A-A, see FIG. 1). Here, only the parts different from the machine 1 of the second embodiment will be explained. The point that in the machine 1 of the fifth embodiment, the turret 3 (first member) and the first arm 4 (second member) are hollow members and that two through holes 31, 32 among the four through holes 30 to 33 respectively open at the inside space of the turret 3 or the first arm 4 differs from the second embodiment. Note that the four through holes 30 to 33 may all respectively open at the inside space of the turret 3 or the first arm 4. Due to this, if the plugs 40 to 43 are for example rubber plugs or screw-in type metal plugs etc., the plugs 40 to 43 will no longer be exposed at the external space, so a machine 1 with a structure inhibiting entangling of workers can be provided. This feature is advantageous in the case where the machine 1 is a collaborative robot and contributes to safety of collaborative robots.

Figure 7:
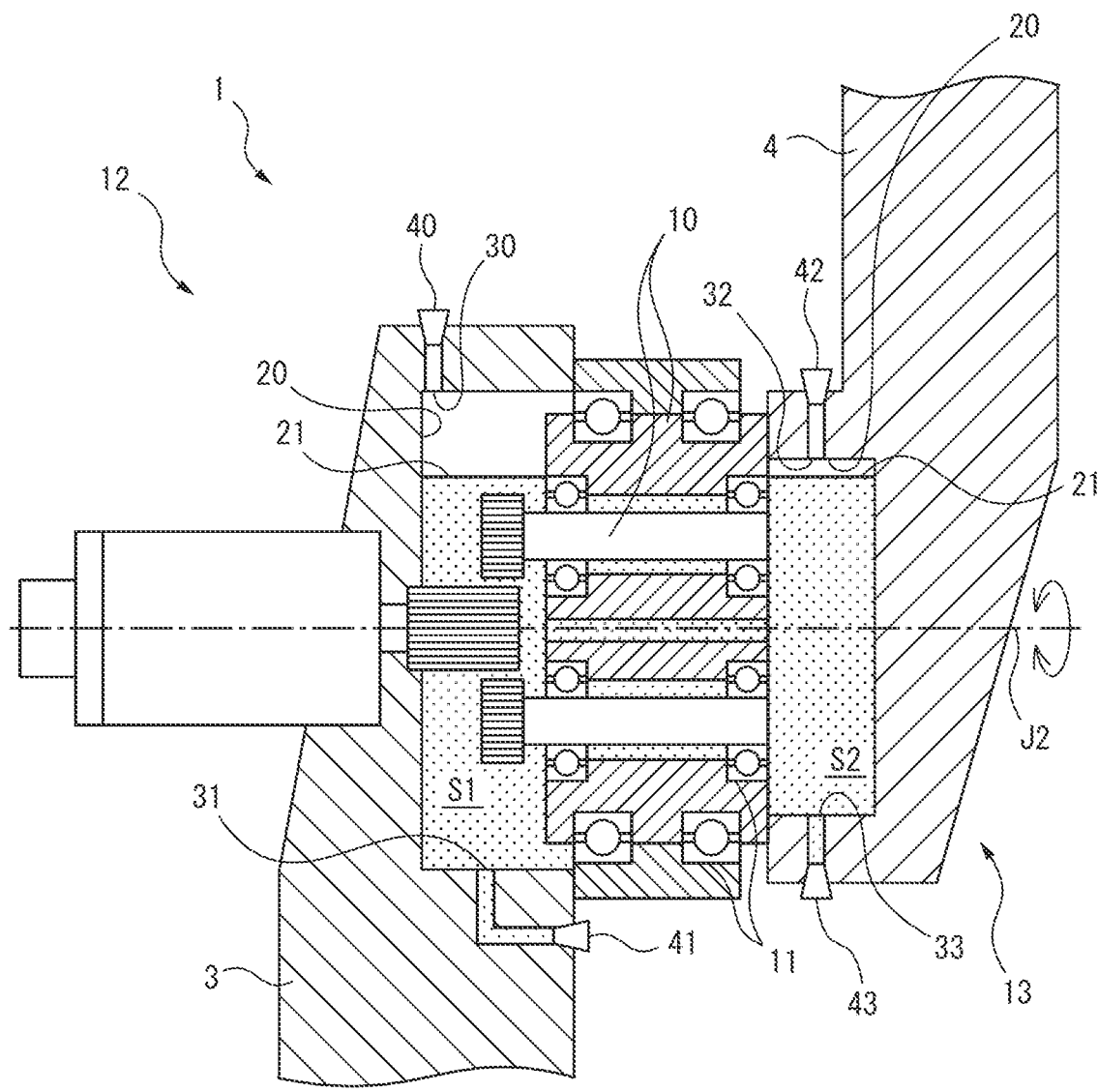
FIG. 7 is a cross-sectional view along a line A-A of a machine of a sixth embodiment.
Figure 8A:
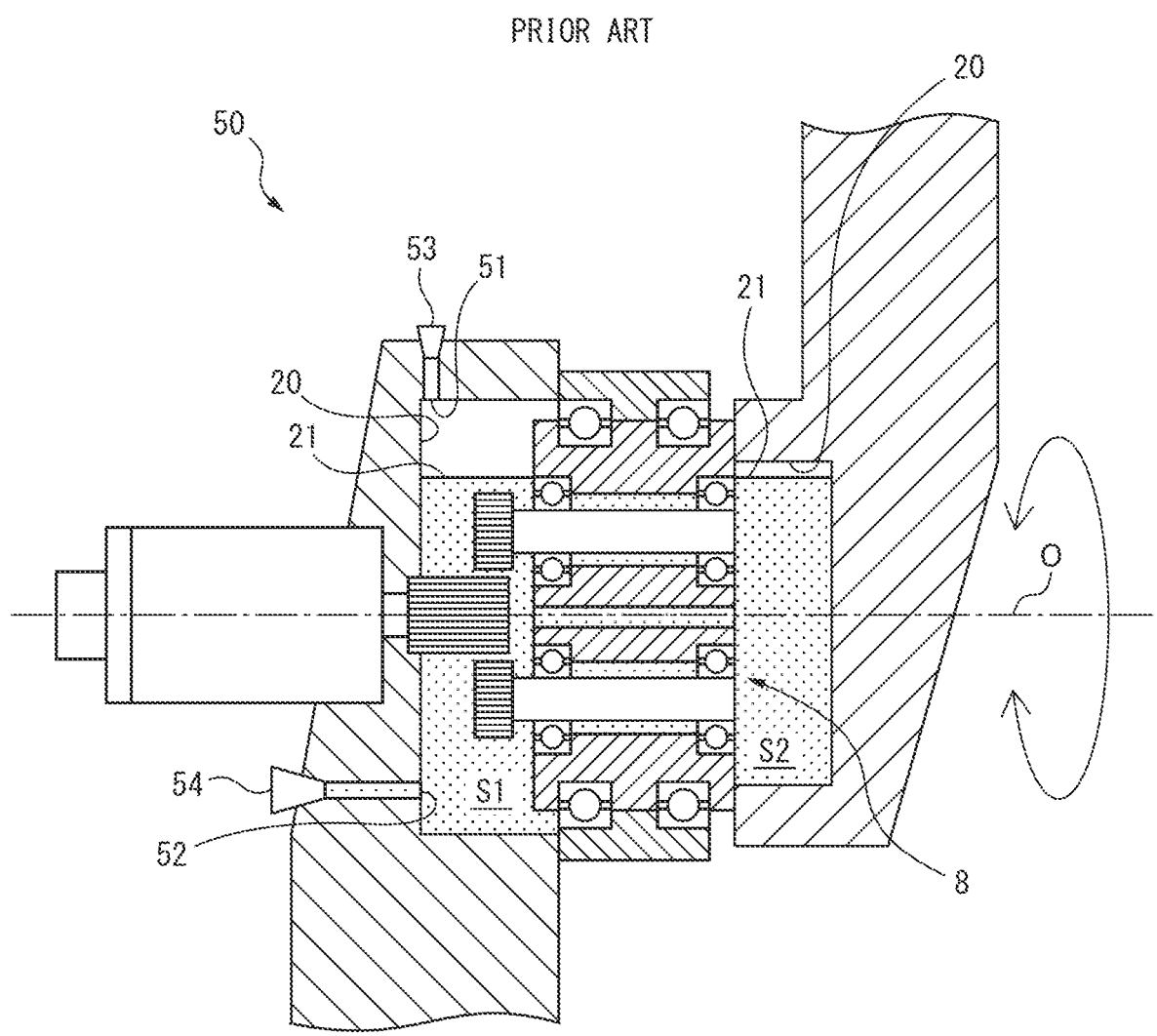
FIG. 8A is a vertical cross-sectional view of a conventional machine.
Figure 8B:
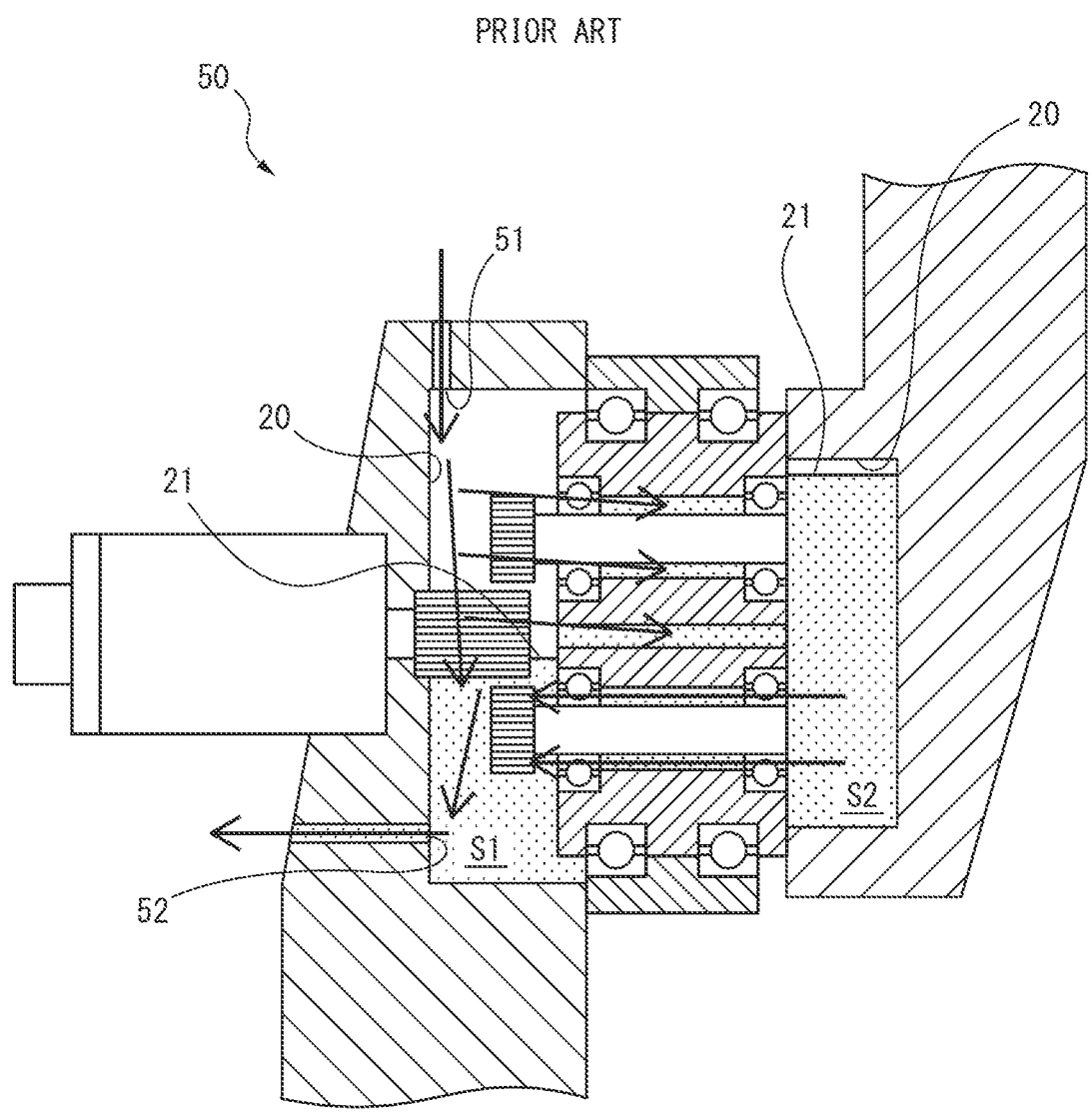
FIG. 8B is a vertical cross-sectional view of a conventional machine showing drainage of a lubricant.

FIG. 7 is a cross-sectional view along a line A-A of a machine 1 of a sixth embodiment (for cutting line A-A, see FIG. 1). Here, only the parts different from the machine 1 of the second embodiment will be explained. In the machine 1 of the sixth embodiment, the two through holes (for example, the through holes 30, 32, the through holes 31, 33, etc.) utilized as vents among the four through holes 30 to 33 are arranged at a side surface 12 at one side of the machine 1 in the direction of the second axis J2 and the remaining two through holes (for example, the through holes 31, 33, through holes 30, 32, etc.) utilized as drain outlets among the four through holes 30 to 33 are arranged at a side surface 13 at an opposite side of the machine 1 in the direction of the second axis J2. By the plurality of through holes 31, 33 unplugged as drain outlets of the lubricant 21 in this way being arranged at the side surface 13 at the same side of the machine 1 in the direction of the second axis J2, the lubricant 21 drained from these through holes 31, 33 can be collected together.

According to the above embodiments, at the time of draining the lubricant 21, the two through holes opening at the spaces at the two sides of the lubrication chamber 20 straddling the bearing 11 (or the speed reducer 8) in the direction of the second axis J2 are unplugged as vents while the remaining one through hole is unplugged as a drain outlet, whereby the air flowing into the through holes utilized as vents pushes out the lubricant 21 at the spaces S1, S2 at the two sides of the lubrication chamber 20 and also pushes out the lubricant 21 pooled inside the bearing 11 (or the speed reducer 8). Due to this, it is possible to drain the lubricant 21 more quickly compared with the past and possible to shorten the maintenance time of the lubricant 21.

In this Description, various embodiments were explained, but the present invention is not limited to the above-mentioned embodiments. It should be understood that various changes can be made within the scope described in the claims.

REFERENCE SIGNS LIST

1 machine
2 base
3 turret (first member)
4 first arm (second member)
5 second arm
6 wrist unit
7 drive source
8 speed reducer
10 shaft
11 bearing
12, 13 side surface
20 lubrication chamber
21 lubricant
30 to 39 through holes
40 to 49 plugs
J1 to J3 axes

The invention claimed is:

1. A machine comprising:
a shaft extending along a predetermined axis;
a bearing receiving the shaft;
a lubrication chamber configured to contain the shaft and the bearing and to store fluid lubricant; and
three pluggable through holes which pass through a wall of the lubrication chamber,
wherein two through holes among the three through holes open at spaces at both sides of the lubrication chamber straddling the bearing, and
when filling the lubricant, at least one through hole among the two through holes is unplugged as a fill inlet of the lubricant, and
when draining the lubricant, the two through holes is unplugged as vents and the remaining one through hole is unplugged as a drain outlet of the lubricant.

2. The machine according to claim 1, wherein at two or more postures of the lubrication chamber, the two through holes can be arranged at positions equal to the top level of the lubricant in the lubrication chamber or at positions higher than the top levels and the remaining one through hole can be arranged at a position lower than the top level of the lubricant in the lubrication chamber.

3. The machine according to claim 1, wherein the lubrication chamber is configured surrounded by a first member and a second member straddling the bearing in the axial direction and the two through holes are respectively arranged at the first member and the second member.

4. The machine according to claim 3, wherein a plurality of the through holes are arranged at predetermined angular intervals about the axis of the first member or the second member.

5. The machine according to claim 3, wherein the first member and the second member are hollow members and the three through holes all respectively open at an inside space of the first member or the second member.

6. The machine according to claim 1, wherein the through holes are arranged in the shaft.

7. The machine according to claim 6, wherein the two through holes merge inside the shaft and open to an external space.

8. The machine according to claim 6, wherein a plurality of the through holes are arranged at predetermined angular intervals about the axis of the shaft.

9. The machine according to claim 1, wherein all of the through holes are arranged on a side surface of one side of the machine in the axial direction.

10. The machine according to claim 1, further comprising a through hole utilized as a drain outlet, a plurality of through holes unplugged as the drain outlets being arranged at a side surface at the same side of the machine in the axial direction.

11. The machine according to claim 1, wherein the shaft and the bearing are machine elements of the speed reducer and the two through holes respectively open at spaces at both sides of the lubrication chamber straddling the speed reducer in the axial direction.

\* \* \* \* \*